(12) United States Patent
Niitsuma et al.

(10) Patent No.: US 7,038,868 B2
(45) Date of Patent: May 2, 2006

(54) METHOD OF MAGNETIC TRANSFER AND STOPPING SLAVE MEDIUM ROTATION

(75) Inventors: Kazuhiro Niitsuma, Kanagawa-ken (JP); Masakazu Nishikawa, Kanagawa-ken (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 143 days.

(21) Appl. No.: 10/364,353

(22) Filed: Feb. 12, 2003

(65) Prior Publication Data

US 2003/0184895 A1   Oct. 2, 2003

(30) Foreign Application Priority Data

Feb. 12, 2002   (JP) .............................. 2002-034107
Feb. 12, 2002   (JP) .............................. 2002-034108

(51) Int. Cl.
*G11B 5/86*   (2006.01)

(52) U.S. Cl. ....................................................... 360/17
(58) Field of Classification Search .................. 360/15, 360/16, 17
See application file for complete search history.

(56) References Cited

U.S. PATENT DOCUMENTS

| | | | |
|---|---|---|---|
| 5,075,801 A | 12/1991 | Chi et al. | |
| 5,991,104 A * | 11/1999 | Bonyhard | 360/15 |
| 6,347,016 B1 | 2/2002 | Ishida et al. | |
| 6,636,371 B1 * | 10/2003 | Komatsu et al. | 360/16 |
| 6,747,823 B1 * | 6/2004 | Saito et al. | 360/17 |
| 6,785,070 B1 * | 8/2004 | Taniguchi et al. | 360/17 |

FOREIGN PATENT DOCUMENTS

| | | |
|---|---|---|
| EP | 1 143 422 A2 | 10/2001 |
| JP | 63-183623 | 7/1988 |
| JP | 2001-14667 | 1/2001 |
| JP | 2001-067663 A | 3/2001 |

* cited by examiner

*Primary Examiner*—David Hudspeth
*Assistant Examiner*—Daniell L. Negrón
(74) *Attorney, Agent, or Firm*—Sughrue Mion, PLLC

(57) ABSTRACT

When magnetically transferring information represented by a pattern of magnetic layer formed on a master information carrier to a disc-like slave medium, an initial DC magnetic field is applied to the slave medium to initially magnetize the slave medium in one direction of concentric recording tracks and a transfer magnetic field is applied to the slave medium in the direction opposite to the direction of the initial-magnetization with the initially-magnetized slave medium held in close contact with the master information carrier. At least one of applying the initial DC magnetic field and applying the transfer magnetic field is effected by applying the magnetic field while the slave medium is being rotated relatively to the magnetic field and stopping the rotation of the slave medium after the intensity of the magnetic field is gradually reduced to not stronger than a predetermined value.

18 Claims, 2 Drawing Sheets

METHOD OF MAGNETIC TRANSFER AND STOPPING SLAVE MEDIUM ROTATION

BACKGROUND OF THE INVENTION

1. Field of the Invention

This invention relates to a method of magnetic transfer for transferring information to a magnetic recording medium (slave medium) from a master information carrier carrying thereon a magnetic layer pattern representing the information to be transferred to the magnetic recording medium.

2. Description of the Related Art

With an increase in information quantity, there is a demand for a magnetic recording medium which is high in capacity, low in cost and preferably requires a short time to read out a necessary part of data (a magnetic recording medium which allows so-called high-speed access). As an example of such a magnetic recording medium, there has been known a high recording density magnetic medium such as a hard disc or a flexible disc. To realize the high capacity, so-called servo tracking technology for causing a magnetic head to accurately trace narrow data tracks plays an important role. To perform the servo tracking, servo information (a servo tracking signal, an address information signal, a reproduction clock signal and the like) is recorded on the disc as so-called preformat.

As a method of recording the preformat accurately and efficiently, there has been proposed, for instance, in Japanese Unexamined Patent Publication No. 63(1988)-183623, and U.S. Pat. No. 6,347,016, a magnetic transfer method in which a pattern which is formed on a master information carrier and represents servo information is copied to a magnetic recording medium (a slave medium) by magnetic transfer.

In the magnetic transfer, a master information carrier having thereon an irregularity pattern (a pattern of protruding portions and recessed portions) representing information (e.g., servo information) to be transferred to a slave medium (a magnetic recording medium such as a magnetic disc) and a magnetic layer formed at least on the protruding portions is brought into a close contact with the slave medium and a transfer magnetic field is applied to the master information carrier and the slave medium in a close contact with each other, whereby a magnetization pattern corresponding to the information represented by the irregularity pattern is magnetically transferred from the master information carrier to the slave medium. Accordingly, the information carried by the master information carrier can be statically recorded on the slave medium with the relative position between the master information carrier and the slave medium kept constant. Thus, according to the magnetic transfer, the preformat recording can be performed accurately and the time required for the preformat recording is very short.

We, this applicant, have proposed in Japanese Unexamined Patent Publication No. 2001-14667 a method of magnetic transfer in which the magnetic layer of the slave medium is initially magnetized in one direction of the recording tracks and a transfer magnetic layer is applied to the slave medium in the direction opposite to the direction of the initial-magnetization with the slave medium held in close contact with the master information carrier. As the simplest method of applying the initial DC magnetic filed and the transfer magnetic field, there can be conceived a method employing a magnetic field applying apparatus in which a magnetic field is established in an area of the recording track and the slave medium or the slave medium and the master information carrier is rotated relatively to the magnetic field so that a magnetic field is applied over the entire area of the recording track of the slave medium. However, the method using such a magnetic field applying apparatus gives rise to a problem that when rotation of the slave medium is stopped (to end the magnetic transfer) in the magnetic field applied, turbulence of the magnetization is generated due to leakage of the magnetic field in the area of the slave medium to which the magnetic field is applied upon stopping of rotation of the slave medium, which results in noise.

SUMMARY OF THE INVENTION

In view of the foregoing observations and description, the primary object of the present invention is to provide an improved method of magnetic transfer which suppresses the influence of the leakage magnetic field upon termination of magnetic transfer and enables to obtain a good reproduction signal high in CN ratio from a transferred slave medium.

In accordance with a first aspect of the present invention, there is provided a method of magnetic transfer for magnetically transferring information represented by a pattern of magnetic layer formed on a master information carrier to a magnetic layer of a disc-like slave medium comprising the steps of applying an initial DC magnetic field to the slave medium to initially magnetize the magnetic layer of the slave medium in one direction of concentric recording tracks and applying a transfer magnetic field to the slave medium in the direction opposite to the direction of the initial-magnetization with the initially-magnetized magnetic layer of the slave medium held in close contact with the magnetic layer on the master information carrier, wherein the improvement comprises that at least one of applying the initial DC magnetic field and applying the transfer magnetic field is effected by applying the magnetic field while the slave medium is being rotated relatively to the magnetic field and stopping the rotation of the slave medium after the intensity of the magnetic field is gradually reduced to not stronger than a predetermined value.

The expression "concentric recording tracks" as used here means recording tracks to be formed on the slave medium by magnetic transfer.

The expression "to transfer information" means to pattern the arrangement of magnetization of the magnetic layer of the slave medium according to the information.

The expression "the initially-magnetized magnetic layer of the slave medium held in close contact with the magnetic layer on the master information carrier" should be interpreted not only to mean a state where the former is in contact with the latter but also to mean a state where the former is held in the vicinity of the latter uniformly spaced from each other.

Further, the magnetic layer of the slave medium may be initially magnetized either in a state where the slave medium is in close contact with the master information carrier or in a state where the slave medium is held away from the master information carrier. In the latter case, the slave medium is brought into close contact with the master information carrier after initial magnetization.

The intensity of the initial DC magnetic field is preferably not lower than the coercive force of the magnetic layer of the slave medium and more preferably not lower than 1.2 times the coercive force of the magnetic layer of the slave medium.

The intensity of the transfer magnetic field is preferably not lower than about 0.6 times the coercive force of the magnetic layer of the slave medium and not higher than about 1.3 times the coercive force of the magnetic layer of the slave medium.

It is preferred that the rotational speed of the slave medium is about several rpm to about several hundred rpm.

The intensity of the magnetic field as mentioned here means that as measured on the surface of the slave medium. For example, "to reduce the intensity of the magnetic field" means to reduce the intensity of the magnetic field as measured on the surface of the slave medium. In the case where the magnetic field is applied by the use of an electromagnet, the intensity of the magnetic field can be reduced either by reducing the magnetic field generated by the electromagnet or by moving the electromagnet away from the slave medium. When the electromagnet is moved away from the slave medium, the electromagnet should be moved in the direction in which the orientation of the magnetic flux on the surface of the slave medium is not changed.

The "predetermined value" is such a value at which the magnetic field cannot affect magnetization of the slave medium, and may be, for instance, not higher than about $1/10$ of the preferable range of the intensity of the magnetic field.

The slave medium may be rotated relatively to the magnetic field either by rotating the slave medium or by rotating the magnetic field.

In accordance with the method of magnetic transfer of the first aspect of the present invention, turbulence of the magnetization is prevented from being generated due to leakage of the magnetic field from the electromagnet or the like upon stopping rotation of the slave medium in the applied magnetic field, whereby a good reproduction signal can be obtained from the slave medium after magnetic transfer.

Though the procedure of applying the magnetic field while the slave medium is being rotated relatively to the magnetic field and stopping the rotation of the slave medium after the intensity of the magnetic field is gradually reduced to not stronger than a predetermined value may be effected when one of the initial DC magnetic field and the transfer magnetic field is applied to the slave medium, a better effect can be obtained when the procedure of applying the magnetic field while the slave medium is being rotated relatively to the magnetic field and stopping the rotation of the slave medium after the intensity of the magnetic field is gradually reduced to not stronger than a predetermined value is effected both when the initial DC magnetic field is applied to the slave medium and when the transfer magnetic field is applied to the slave medium.

In accordance with a second aspect of the present invention, there is provided a method of magnetic transfer for magnetically transferring information represented by a pattern of magnetic layer formed on a master information carrier to a magnetic layer of a disc-like slave medium comprising the steps of applying an initial DC magnetic field to the slave medium to initially magnetize the magnetic layer of the slave medium in one direction of concentric recording tracks and applying a transfer magnetic field to the slave medium in the direction opposite to the direction of the initial-magnetization with the initially-magnetized magnetic layer of the slave medium held in close contact with the magnetic layer on the master information carrier, wherein the improvement comprises that at least one of applying the initial DC magnetic field and applying the transfer magnetic field is effected by applying a magnetic field to a part of the slave medium while the slave medium is being rotated relatively to the magnetic field and moving the slave medium relatively to the magnetic field so that the center of the slave medium is moved away from the magnetic field in a radial direction with the slave medium kept rotated.

It is preferred that the intensity of the magnetic field be gradually reduced to not stronger than a predetermined value while moving the slave medium relatively to the magnetic field so that the center of the slave medium is moved away from the magnetic field in a radial direction in at least one of applying the initial DC magnetic field and applying the transfer magnetic field.

The expression "concentric recording tracks" as used here means recording tracks to be formed on the slave medium by magnetic transfer.

The expression "to transfer information" means to pattern the arrangement of magnetization of the magnetic layer of the slave medium according to the information.

The expression "the initially-magnetized magnetic layer of the slave medium held in close contact with the magnetic layer on the master information carrier" should be interpreted not only to mean a state where the former is in contact with the latter but also to mean a state where the former is held in the vicinity of the latter uniformly spaced from each other.

Further, the magnetic layer of the slave medium may be initially magnetized either in a state where the slave medium is in close contact with the master information carrier or in a state where the slave medium is held away from the master information carrier. In the latter case, the slave medium is brought into close contact with the master information carrier after initial magnetization.

The intensity of the initial DC magnetic field is preferably not lower than the coercive force of the magnetic layer of the slave medium and more preferably not lower than 1.2 times the coercive force of the magnetic layer of the slave medium.

The intensity of the transfer magnetic field is preferably not lower than about 0.6 times the coercive force of the magnetic layer of the slave medium and not higher than about 1.3 times the coercive force of the magnetic layer of the slave medium.

It is preferred that the rotational speed of the slave medium is about several rpm to about several hundred rpm.

The slave medium may be moved relatively to the magnetic field either by moving one of the slave medium and the magnetic field or by moving both the slave medium and the magnetic field.

The initial DC magnetic field and the transfer magnetic field may be generated either by an electromagnet unit or by a permanent magnet unit.

In accordance with the method of magnetic transfer of the second aspect of the present invention, turbulence of the magnetization is prevented from being generated due to leakage of the magnetic field from the electromagnet or the like upon stopping rotation of the slave medium in the applied magnetic field, whereby a good reproduction signal can be obtained from the slave medium after magnetic transfer.

Though applying the magnetic field while the slave medium is being rotated relatively to the magnetic field and moving the slave medium relatively to the magnetic field so that the center of the slave medium is moved away from the magnetic field in a radial direction with the slave medium kept rotated may be effected when one of the initial DC magnetic field and the transfer magnetic field is applied to the slave medium, a better effect can be obtained when applying the magnetic field while the slave medium is being rotated relatively to the magnetic field and moving the slave medium relatively to the magnetic field so that the center of the slave medium is moved away from the magnetic field in a radial direction with the slave medium kept rotated are effected both when the initial DC magnetic field is applied to the slave medium and when the transfer magnetic field is applied to the slave medium.

When the intensity of the magnetic field is gradually reduced to not stronger than a predetermined value while moving the slave medium relatively to the magnetic field so that the center of the slave medium is moved away from the magnetic field in a radial direction in at least one of applying the initial DC magnetic field and applying the transfer magnetic field, turbulence of the magnetization is further prevented from being generated due to leakage of the magnetic field from the electromagnet or the like upon stopping rotation of the slave medium in the applied magnetic field, whereby a better reproduction signal can be obtained from the slave medium after magnetic transfer.

DESCRIPTION OF THE PREFERRED EMBODIMENTS

Figure 1:
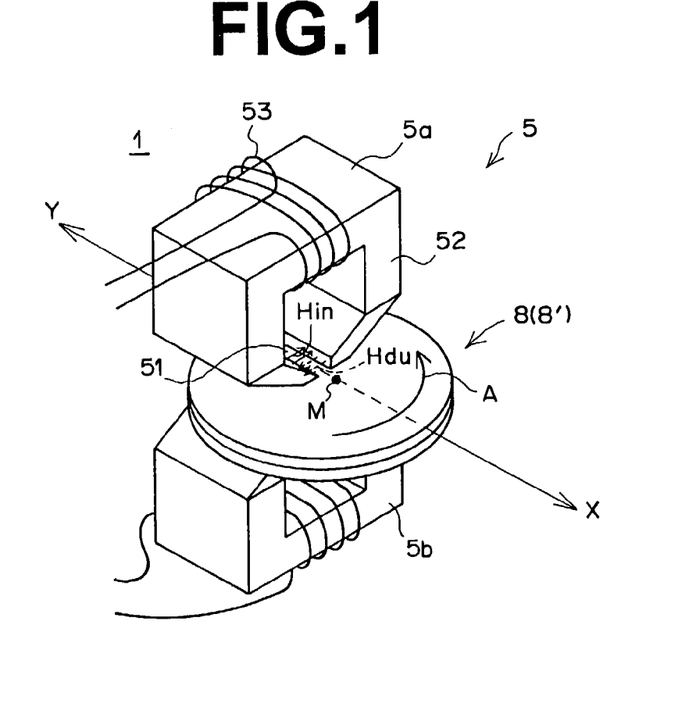
FIG. 1 is a perspective view showing a magnetic transfer apparatus for carrying out a method of magnetic transfer in accordance with first and second embodiments of the present invention.

In FIG. 1, a pair of pieces of information are transferred to opposite sides of a slave medium (magnetic recording medium) 2 by a method of magnetic transfer in accordance with an embodiment of the present invention from a pair of master information carriers 3 and 4.

The magnetic transfer apparatus shown in FIG. 1 comprises an electromagnet unit 5 having upper and lower electromagnets 5a and 5b, and a holder 8 which is disposed between the upper and lower electromagnets 5a and 5b and is rotated in the direction of arrow A by a drive means (not shown).

The holder 8 is like a disc in shape and comprises upper and lower discs. When an initial DC magnetic field is applied to the slave medium 2, the slave medium 2 is held between the upper and lower discs of the holder 8, whereas when a transfer magnetic field is applied to the slave medium 2, the slave medium 2 and the master information carriers 3 and 4 in close contact with the respective sides of the slave medium 2 are held between the upper and lower discs of the holder 8. Accordingly, to rotate the holder 8 is equivalent to rotate the slave medium 2 or to rotate the slave medium 2 and the master information carriers 3 and 4 in close contact with the slave medium 2.

Figure 2:
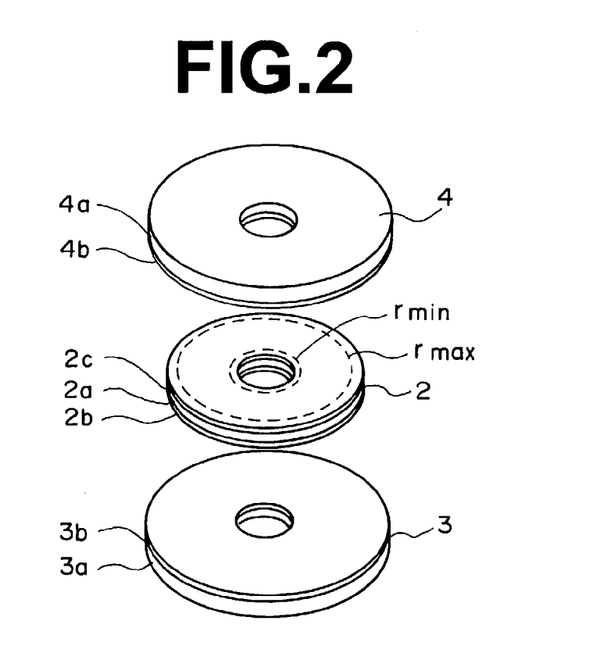
FIG. 2 is an exploded perspective view of a double-sided slave medium and a pair of master information carriers carrying thereon master information to be transferred to opposite sides of the slave medium.

The slave medium 2 is a disc-like magnetic recording medium such as a hard disc, a flexible disc or the like. The slave medium 2 shown in FIG. 2 is a double-sided magnetic recording medium comprising a disc-like base sheet 2a and magnetic layers 2b and 2c formed on opposite sides of the base sheet 2a.

The master information carriers 3 and 4 are like a disc in shape and comprises base sheets 3a and 4a having on their one sides irregularity patterns representing information to be transferred to the magnetic layers 2b and 2c of the magnetic recording media (slave media) and soft magnetic layers 3b and 4b provided on the surface of the base sheets 3a and 4a. The irregularity patterns respectively carried by the master information carriers 3 and 4 represent information to be transferred to the lower magnetic layer 2b and the upper magnetic layer 2c. The magnetic layers 3b and 4b of the master information carriers 3 and 4 are brought into close contact with the lower and upper magnetic layers 2b and 2c with the other sides held by the lower and upper discs of the holder 8. The information carried by the master information carriers 3 and 4 may be transferred to opposite sides of the slave medium 2 either simultaneously or in sequence.

Each of the upper and lower electromagnets 5a and 5b of the electromagnet unit 5 comprises a core 52 having a gap 51 which radially extends from a minimum radius track $r_{min}$ to a maximum radius track $r_{max}$ of the slave medium 2 and a winding 53 wound around the core 52, and the upper and lower electromagnets 5a and 5b generate magnetic fields having magnetic lines of force parallel to the direction of the tracks in the same directions on opposite sides of the slave medium 2. It is not necessary to provide an electromagnet on each side of the slave medium but an electromagnet may be provided only on one side of the slave medium 2.

The magnetic field is applied to the entire area of the tracks while rotating the holder 8 holding the slave medium 2 or the slave medium 2 and the master information carrier 3 and/or 4 in close contact with the slave medium 2 relatively to the magnetic field. When the gap 51 of each of the electromagnets 5a and 5b extends from the minimum radius track $r_{min}$ to the maximum radius track $r_{max}$ of the slave medium 2, a uniform magnetic field can be applied to the entire area of the tracks by once rotating the slave medium 2 about the electromagnets 5a and 5b. When the gap 51 of each of the electromagnets 5a and 5b does not extend from the minimum radius track $r_{min}$ to the maximum radius track $r_{max}$ of the slave medium 2, the slave medium 2 is moved radially moved relatively to the electromagnets 5a and 5b while rotated about the electromagnets 5a and 5b.

Figure 3A:
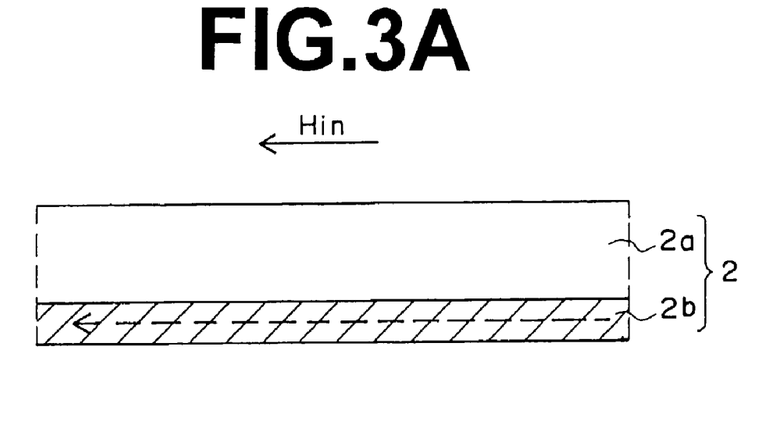
FIGS. 3A to 3C are views for illustrating basic steps of magnetic transfer to a magnetic recording medium.
Figure 3B:
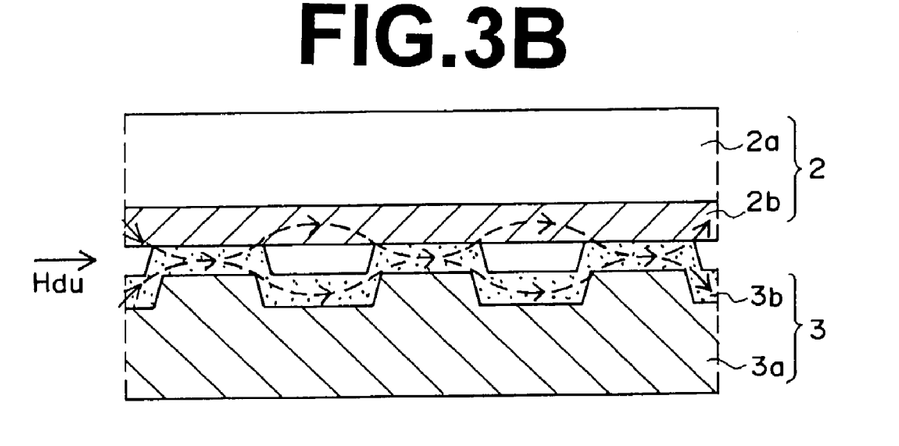
Figure 3C:
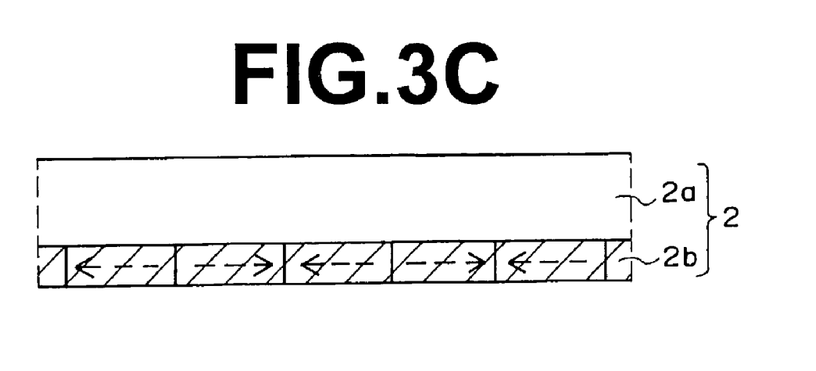

Magnetic transfer of information to a slave medium (magnetic recording medium) in accordance with a first embodiment of the present invention using the magnetic transfer apparatus shown in FIG. 1 will be described with reference to FIGS. 3A to 3C, hereinbelow. In FIGS. 3A to 3C, only the lower magnetic layer 2b and the lower master information carrier 3 are shown.

The slave medium 2 is set between the upper and lower discs of the holder 8 and the holder 8 together with the slave medium 2 is positioned in place between the upper and lower electromagnets 5a and 5b of the electromagnet units 5 generating an initial DC magnetic field Hin in the direction of the arrow in FIG. 3A, thereby magnetizing the magnetic layers 2b and 2c of the slave medium 2 in an initial DC magnetization as shown in FIG. 3A. At this time, the holder 8 is positioned so that the longitudinal direction of the electromagnets 5a and 5b conforms to a radial direction of the holder 8. Thereafter, the holder 8 is caused to make one rotation relatively to the electromagnets 5a and 6b in the direction arrow A (FIG. 1). After the holder 8 makes one rotation, the intensity of the magnetic field generated by the electromagnets 5a and 5b is gradually reduced. When the intensity of the magnetic field is reduced to not stronger than a predetermined value, rotation of the holder 8 is stopped and the holder 8 is removed from between the upper and lower electromagnets 5a and 5b.

The intensity of the initial DC magnetic field is preferably not lower than the coercive force Hcs of the magnetic layer of the slave medium 2 and more preferably not lower than 1.2 times the coercive force Hcs of the magnetic layer of the slave medium 2. The "predetermined value" is, for instance, not higher than about 1/10 of the intensity of the initial DC magnetic field but may be any value so long as the initial DC magnetic field cannot affect magnetization of the slave medium 2.

Thereafter, the magnetic layer 3b of the lower master information carrier 3 and the magnetic layer 4b of the upper master information carrier 4 are brought into close contact with the lower and upper magnetic layers 2b of the slave medium 2 by the holder 8. In this state, the holder 8 together with the slave medium 2 and the master information carriers 3 and 4 in close contact with opposite sides of the slave medium 2 is positioned in place between the upper and lower electromagnets 5a and 5b of the electromagnet units 5 generating a transfer magnetic field Hdu in a direction opposite to the initial DC magnetic field as shown in FIG. 3B. Also at this time, the holder 8 is positioned so that the longitudinal direction of the electromagnets 5a and 5b conforms to a radial direction of the holder 8. Thereafter, the holder 8 is caused to make one rotation relatively to the electromagnets 5a and 6b in the direction arrow A (FIG. 1), thereby effecting magnetic transfer.

After the holder 8 makes one rotation, the intensity of the magnetic field generated by the electromagnets 5a and 5b is gradually reduced. When the intensity of the magnetic field is reduced to not stronger than a predetermined value, rotation of the holder 8 is stopped and the holder 8 is removed from between the upper and lower electromagnets 5a and 5b.

The intensity of the transfer magnetic field Hdu is preferably 0.6 times to 1.3 times the coercive force Hcs of the magnetic layer of the slave medium 2, more preferably 0.8 to 1.2 times the coercive force Hcs of the magnetic layer of the slave medium 2, and most preferably 1 to 1.1 times the coercive force Hcs of the magnetic layer of the slave medium 2. The "predetermined value" is, for instance, not higher than about 1/10 of the intensity of the transfer magnetic field but may be any value so long as the transfer magnetic field cannot affect magnetization of the slave medium 2.

Though, being reduced by reducing the intensity of the magnetic field generated by the electromagnet unit 5 in the embodiment described above, the intensity of the magnetic field applied to the slave medium 2 may be reduced by moving the electromagnets 5a and 5b away from the surface of the slave medium 2 in perpendicular to the surface of the slave medium 2 so that the magnetic field is moved away from the surface of the slave medium 2. In this case, permanent magnets can be employed in place of the electromagnets 5a and 5b.

In the case where the irregularity pattern representing information to be transferred is a negative pattern reverse to the positive pattern shown in FIGS. 3A to 3C, the information can be magnetically transferred to the slave medium 2 by reversing the directions of the initial DC magnetic field Hin and the transfer magnetic field Hdu.

EXAMPLES

Using a magnetic transfer apparatus which was substantially equal to that described above, information was recorded on a slave medium by magnetic transfer from a master information carrier by methods in accordance with the prior art (comparative example) and in accordance with first to sixth embodiments of the present invention. In any of the comparative example and the first to sixth embodiments of the present invention, the slave medium was 278.8 kA/m (3500 Oe) in coercive force, the intensity of the initial DC magnetic field Hin was 557.2 kA/m (7000 Oe), the distance between the tip of the magnetic pole and the surface of the slave medium when applying the initial DC magnetic field was 2.5 mm, the intensity of the transfer magnetic field Hdu was 278.8 kA/m (3500 Oe), the distance between the tip of the magnetic pole and the surface of the slave medium when applying the transfer magnetic field was 10 mm, and the contact pressure between the slave medium and the master information carrier was 2 Kg/cm$^2$.

In the comparative example and the first to sixth embodiments, magnetic transfer was executed in the following manner.

Comparative Example (c/o ex)

The holder was inserted into the magnetic field, rotated, stopped after rotated by an amount equal to or more than one rotation, and then drawn out from the magnetic field both when the initial DC magnetic field was applied and when the transfer magnetic field was applied.

First Embodiment (Emb. 1)

The initial DC magnetic field was applied by inserting the holder into the magnetic field, rotating the holder at 60 rpm, gradually reducing the intensity of the magnetic field at a rate of 8.0 kA/Sec (100 Oe/Sec) with the holder kept rotated at 60 rpm after rotated by an amount equal to or more than one rotation, stopping rotation of the holder when the intensity of the magnetic field was reduced to 0, and then removing the holder. The transfer magnetic field was applied in the same manner as in the comparative example.

Second Embodiment (Emb. 2)

The initial DC magnetic field was applied by inserting the holder into the magnetic field, rotating the holder at 600 rpm, gradually reducing the intensity of the magnetic field at a rate of 39.8 kA/Sec (500 Oe/Sec) with the holder kept rotated at 600 rpm after rotated by an amount equal to or more than one rotation, stopping rotation of the holder when the intensity of the magnetic field was reduced to 0, and then removing the holder. The transfer magnetic field was applied in the same manner as in the comparative example.

Third Embodiment (Emb. 3)

The initial DC magnetic field was applied in the same manner as in the comparative example. The transfer magnetic field was applied by inserting the holder into the magnetic field, rotating the holder at 60 rpm, gradually reducing the intensity of the magnetic field at a rate of 8.0 kA/Sec (100 Oe/Sec) with the holder kept rotated at 60 rpm after rotated by an amount equal to or more than one rotation, stopping rotation of the holder when the intensity of the magnetic field was reduced to 0, and then removing the holder.

Fourth Embodiment (Emb. 4)

The initial DC magnetic field was applied in the same manner as in the comparative example. The transfer magnetic field was applied by inserting the holder into the magnetic field, rotating the holder at 600 rpm, gradually reducing the intensity of the magnetic field at a rate of 39.8 kA/Sec (500 Oe/Sec) with the holder kept rotated at 600 rpm after rotated by an amount equal to or more than one rotation, stopping rotation of the holder when the intensity of the magnetic field was reduced to 0, and then removing the holder.

Fifth Embodiment (Emb. 5)

The initial DC magnetic field the transfer magnetic field were applied by inserting the holder into the magnetic field, rotating the holder at 60 rpm, gradually reducing the intensity of the magnetic field at a rate of 8.0 kA/Sec (100 Oe/Sec) with the holder kept rotated at 60 rpm after rotated by an amount equal to or more than one rotation, stopping rotation of the holder when the intensity of the magnetic field was reduced to 0, and then removing the holder.

Sixth Embodiment (Emb. 6)

The initial DC magnetic field the transfer magnetic field were applied by inserting the holder into the magnetic field, rotating the holder at 600 rpm, gradually reducing the intensity of the magnetic field at a rate of 39.8 kA/Sec (500 Oe/Sec) with the holder kept rotated at 600 rpm after rotated by an amount equal to or more than one rotation, stopping rotation of the holder when the intensity of the magnetic field was reduced to 0, and then removing the holder.

With the levels of the signal C and the noise N obtained from the slave medium when magnetic transfer was executed by the method in accordance with the prior art taken as 0 dB and the value of signal/noise ratio CNR obtained from the slave medium when magnetic transfer was executed by the method in accordance with the prior art taken as 0, relative values of the levels of the signal C and the noise N obtained from the slave medium when magnetic transfer was executed by the method in accordance with the respective embodiments and the relative value of signal/noise ratio CNR obtained from the slave medium when magnetic transfer was executed by the method in accordance with the respective embodiments were shown in the following table 1.

TABLE 1

|        | signal C (dB) | noise N (dB) | CNR |
|--------|---------------|--------------|-----|
| c/o EX | 0             | 0            | 0   |
| emb. 1 | 2.0           | −1.5         | 3.5 |
| emb. 2 | 1.8           | −1.3         | 3.1 |
| emb. 3 | 1.0           | −0.5         | 1.5 |
| emb. 4 | 0.8           | −0.3         | 1.1 |
| emb. 5 | 2.6           | −1.8         | 4.4 |
| emb. 6 | 2.4           | −1.5         | 3.9 |

As can be seen from table 1, when information is magnetically transferred to a slave medium from a master information carrier carrying thereon the information by magnetic transfer in accordance with the present invention, a better reproduction signal higher in signal/noise ratio CNR can be obtained from the slave medium as compared with when the information is magnetically transferred by magnetic transfer in accordance with the prior art.

Since the intensity of the initial DC magnetic field is stronger than that of the transfer magnetic field, the procedure of applying the magnetic field while the slave medium is being rotated relatively to the magnetic field and stopping the rotation of the slave medium after the intensity of the magnetic field is gradually reduced to not stronger than a predetermined value is more effective when executed upon application of the initial DC magnetic field than when executed upon application of the transfer magnetic field. Further, the fifth and sixth embodiments indicate that a better result can be obtained when the procedure of applying the magnetic field while the slave medium is being rotated relatively to the magnetic field and stopping the rotation of the slave medium after the intensity of the magnetic field is gradually reduced to not stronger than a predetermined value is effected both when the initial DC magnetic field is applied to the slave medium and when the transfer magnetic field is applied to the slave medium.

Further the result shown in table 1 indicates that there is a tendency that as the rotational speed of the slave medium is reduced and as the rate at which the intensity of the magnetic field is reduced, a better reproduction signal higher in signal/noise ratio CNR can be obtained from the slave medium.

Magnetic transfer of information to a slave medium (magnetic recording medium) in accordance with a second embodiment of the present invention using the magnetic transfer apparatus shown in FIG. 1 will be described with reference to FIGS. 3A to 3C, hereinbelow. In FIGS. 3A to 3C, only the lower magnetic layer 2b and the lower master information carrier 3 are shown.

The slave medium 2 is set between the upper and lower discs of the holder 8 and the holder 8 together with the slave medium 2 is positioned in place between the upper and lower electromagnets 5a and 5b of the electromagnet units 5 generating an initial DC magnetic field Hin in the direction of the arrow in FIG. 3A, thereby magnetizing the magnetic layers 2b and 2c of the slave medium 2 in an initial DC magnetization as shown in FIG. 3A. At this time, the holder 8 is positioned so that the longitudinal direction of the electromagnets 5a and 5b conforms to a radial direction of the holder 8. Thereafter, the holder 8 is caused to make one rotation relatively to the electromagnets 5a and 6b in the direction arrow A (FIG. 1). After the holder 8 makes one rotation, the slave medium is moved relatively to the magnetic field in the direction of arrow X (FIG. 1) so that the center M of the holder 8 (i. e., the center of the slave medium 2) is moved away from the magnetic field in a radial direction with the holder 8 kept rotated. After the holder 8 is moved to a position where the influence of the magnetic field on magnetization of the slave medium 2 is sufficiently small, rotation of the holder 8 is stopped.

The intensity of the initial DC magnetic field Hin is preferably not lower than the coercive force Hcs of the magnetic layer of the slave medium 2 and more preferably not lower than 1.2 times the coercive force Hcs of the magnetic layer of the slave medium 2.

Thereafter, the magnetic layer 3b of the lower master information carrier 3 and the magnetic layer 4b of the upper master information carrier 4 are brought into close contact with the lower and upper magnetic layers 2b of the slave medium 2 by the holder 8. In this state, the holder 8 together with the slave medium 2 and the master information carriers 3 and 4 in close contact with opposite sides of the slave medium 2 is positioned in place between the upper and lower electromagnets 5a and 5b of the electromagnet units 5 generating a transfer magnetic field Hdu in a direction opposite to the initial DC magnetic field as shown in FIG. 3B. Also at this time, the holder 8 is positioned so that the longitudinal direction of the electromagnets 5a and 5b conforms to a radial direction of the holder 8. Thereafter, the holder 8 is caused to make one rotation relatively to the electromagnets 5a and 6b in the direction arrow A (FIG. 1), thereby effecting magnetic transfer.

After the holder 8 makes one rotation, the slave medium is moved relatively to the magnetic field in the direction of arrow X so that the center M of the holder 8 (i. e., the center of the slave medium 2) is moved away from the magnetic field in a radial direction with the holder 8 kept rotated. After the holder 8 is moved to a position where the influence of the magnetic field on magnetization of the slave medium 2 is sufficiently small, rotation of the holder 8 is stopped.

The intensity of the transfer magnetic field Hdu is preferably 0.6 to 1.3 times the coercive force Hcs of the magnetic layer of the slave medium 2, more preferably 0.8 to 1.2 times the coercive force Hcs of the magnetic layer of the slave medium 2, and most preferably 1 to 1.1 times the coercive force Hcs of the magnetic layer of the slave medium 2.

Though, in the embodiment described above, the slave medium is moved relatively to the magnetic field in the direction of arrow X after the holder 8 makes one rotation to move the center M of the holder 8 (i. e., the center of the slave medium 2) away from the magnetic field, instead the upper and lower magnets 5a and 5b may be moved in the direction of arrow Y (FIG. 1).

In the case where the irregularity pattern representing information to be transferred is a negative pattern reverse to the positive pattern shown in FIGS. 3A to 3C, the information can be magnetically transferred to the slave medium 2 by reversing the directions of the initial DC magnetic field Hin and the transfer magnetic field Hdu.

When the magnetic field generator comprises an electromagnet unit as in the second embodiment, it is preferred that the intensity of the magnetic field generated by the electromagnet units 5 is gradually reduced to not stronger than a predetermined value while moving the holder 8 relatively to the magnetic field in the radial direction X or moving the electromagnet units 5 in direction of arrow Y with the holder 8 kept rotated after the holder 8 is rotated once or more in the initial DC magnetic field and/or the transfer magnetic field. The "predetermined value" is such a value at which the magnetic field cannot affect magnetization of the slave medium 2, and may be, for instance, not higher than about $\frac{1}{10}$ of the preferable range of the intensity of the initial DC magnetic field Hin or the transfer magnetic field Hdu.

EXAMPLES

Using a magnetic transfer apparatus which was substantially equal to that described above, information was recorded on a slave medium by magnetic transfer from a master information carrier by methods in accordance with the prior art (comparative example) and in accordance with seventh to thirteenth embodiments of the present invention. In any of the comparative example and the seventh to thirteenth embodiments of the present invention, the slave medium was 278.8 kA/m (3500 Oe) in coercive force, the intensity of the initial DC magnetic field Hin was 557.2 kA/m (7000 Oe), the distance between the tip of the magnetic pole and the surface of the slave medium when applying the initial DC magnetic field was 2.5 mm, the intensity of the transfer magnetic field Hdu was 278.8 kA/m (3500 Oe), the distance between the tip of the magnetic pole and the surface of the slave medium when applying the transfer magnetic field was 10 mm, and the contact pressure between the slave medium and the master information carrier was 2 Kg/cm².

In the comparative example and the seventh to twelfth embodiments, magnetic transfer was executed in the following manner.

Comparative Example (c/o ex)

The holder was inserted into the magnetic field, rotated, stopped after rotated by an amount equal to or more than one rotation, and then drawn out from the magnetic field both when the initial DC magnetic field was applied and when the transfer magnetic field was applied.

Seventh Embodiment (Emb. 7)

The initial DC magnetic field was applied by inserting the holder into the magnetic field, rotating the holder at 60 rpm, radially moving the holder to move away from the magnetic filed at a speed of 1 mm/Sec with the holder kept rotated at 60 rpm after rotated by an amount equal to or more than one rotation, and stopping rotation of the holder at a distance of 20 cm from the magnetic field. The transfer magnetic field was applied in the same manner as in the comparative example.

Eighth Embodiment (Emb. 8 )

The initial DC magnetic field was applied by inserting the holder into the magnetic field, rotating the holder at 600 rpm, radially moving the holder to move away from the magnetic filed at a speed of 10 mm/Sec with the holder kept rotated at 600 rpm after rotated by an amount equal to or more than one rotation, and stopping rotation of the holder at a distance of 20 cm from the magnetic field. The transfer magnetic field was applied in the same manner as in the comparative example.

Ninth Embodiment (Emb. 9)

The initial DC magnetic field was applied in the same manner as in the comparative example. The transfer magnetic field was applied by inserting the holder into the magnetic field, rotating the holder at 60 rpm, radially moving the holder to move away from the magnetic filed at a speed of 1 mm/Sec with the holder kept rotated at 60 rpm after rotated by an amount equal to or more than one rotation, and stopping rotation of the holder at a distance of 20 cm from the magnetic field.

Tenth Embodiment (Emb. 10)

The initial DC magnetic field was applied in the same manner as in the comparative example. The transfer magnetic field was applied by inserting the holder into the magnetic field, rotating the holder at 600 rpm, radially moving the holder to move away from the magnetic filed at a speed of 10 mm/Sec with the holder kept rotated at 600 rpm after rotated by an amount equal to or more than one rotation, and stopping rotation of the holder at a distance of 20 cm from the magnetic field.

Eleventh Embodiment (Emb. 11)

The initial DC magnetic field the transfer magnetic field were applied by inserting the holder into the magnetic field, rotating the holder at 60 rpm, radially moving the holder to move away from the magnetic filed at a speed of 1 mm/Sec with the holder kept rotated at 60 rpm after rotated by an amount equal to or more than one rotation, and stopping rotation of the holder at a distance of 20 cm from the magnetic field.

Twelfth Embodiment (Emb. 12)

The initial DC magnetic field and the transfer magnetic field were applied by inserting the holder into the magnetic field, rotating the holder at 600 rpm, radially moving the holder to move away from the magnetic filed at a speed of 10 mm/Sec with the holder kept rotated at 600 rpm after rotated by an amount equal to or more than one rotation, and stopping rotation of the holder at a distance of 20 cm from the magnetic field.

Thirteenth Embodiment (Emb. 13)

The initial DC magnetic field and the transfer magnetic field were applied by inserting the holder into the magnetic field, rotating the holder at 600 rpm, radially moving the holder to move away from the magnetic filed at a speed of 10 mm/Sec with the holder kept rotated at 600 rpm while reducing the intensity of the magnetic field at a rate of 39.8 kA/m/sec (500 Oe/sec) after rotated by an amount equal to or more than one rotation, and stopping rotation of the holder at a distance of 20 cm from the magnetic field.

With the levels of the signal C and the noise N obtained from the slave medium when magnetic transfer was executed by the method in accordance with the prior art taken as 0 dB and the value of signal/noise ratio CNR obtained from the slave medium when magnetic transfer was executed by the method in accordance with the prior art taken as 0, relative values of the levels of the signal C and the noise N obtained from the slave medium when magnetic transfer was executed by the method in accordance with the respective embodiments and the relative value of signal/noise ratio CNR obtained from the slave medium when magnetic transfer was executed by the method in accordance with the respective embodiments were shown in the following table 2.

TABLE 2

|   | signal C (dB) | noise N (dB) | CNR |
|---|---|---|---|
| c/o EX | 0 | 0 | 0 |
| emb. 7 | 1.4 | −1.1 | 2.5 |
| emb. 8 | 1.3 | −1.0 | 2.3 |
| emb. 9 | 0.7 | −0.4 | 1.1 |
| emb. 10 | 0.6 | −0.2 | 0.8 |
| emb. 11 | 1.8 | −1.3 | 3.1 |
| emb. 12 | 1.7 | −1.1 | 2.8 |
| emb. 13 | 2.0 | −1.6 | 3.6 |

As can be seen from table 2, when information is magnetically transferred to a slave medium from a master information carrier carrying thereon the information by magnetic transfer in accordance with the present invention, a better reproduction signal higher in signal/noise ratio CNR can be obtained from the slave medium as compared with when the information is magnetically transferred by magnetic transfer in accordance with the prior art.

Since the intensity of the initial DC magnetic field is stronger than that of the transfer magnetic field, the procedure of applying the magnetic field while the slave medium is being rotated relatively to the magnetic field and moving the slave medium relatively to the magnetic field so that the center of the slave medium is moved away from the magnetic field in a radial direction with the slave medium kept rotated is more effective when executed upon application of the initial DC magnetic field than when executed upon application of the transfer magnetic field. Further, the eleventh and twelfth embodiments indicate that a better result can be obtained when the procedure of applying the magnetic field while the slave medium is being rotated relatively to the magnetic field and moving the slave medium relatively to the magnetic field so that the center of the slave medium is moved away from the magnetic field in a radial direction with the slave medium kept rotated is effected both when the initial DC magnetic field is applied to the slave medium and when the transfer magnetic field is applied to the slave medium.

Further the result shown in table 2 indicates that there is a tendency that as the rotational speed of the slave medium is reduced and as the rate at which the holder is moved away from the magnetic field is reduced, a better reproduction signal higher in signal/noise ratio CNR can be obtained from the slave medium.

Further, by gradually reducing the intensity of the magnetic field while moving the holder away from the magnetic field as in the thirteenth embodiment, a further better reproduction signal can be obtained from the slave medium.

What is claimed is:

1. A method of magnetic transfer for magnetically transferring information represented by a pattern of magnetic layer formed on a master information carrier to a magnetic layer of a disc-like slave medium comprising the steps of applying an initial DC magnetic field to the slave medium to initially magnetize the magnetic layer of the slave medium in one direction of concentric recording tracks and applying a transfer magnetic field to the slave medium in the direction opposite to the direction of the initial-magnetization with the initially-magnetized magnetic layer of the slave medium held in close contact with the magnetic layer on the master information carrier, wherein the improvement comprises that at least one of applying the initial DC magnetic field and applying the transfer magnetic field is effected by applying the magnetic field while the slave medium is being rotated relatively to the magnetic field and stopping the rotation of the slave medium after the intensity of the magnetic field is gradually reduced to not stronger than a predetermined value, and wherein the intensity of the initial DC magnetic field is not lower than the coercive force of the magnetic layer of the slave medium.

2. A method as defined in claim 1 in which the intensity of the initial DC magnetic field is not lower than 1.2 times the coercive force of the magnetic layer of the slave medium.

3. A method as defined in claim 1 in which the intensity of the transfer magnetic field is not lower than about 0.6 times the coercive force of the magnetic layer of the slave medium and not higher than about 1.3 times the coercive force of the magnetic layer of the slave medium.

4. A method as defined in claim 1 in which the slave medium is rotated at about several rpm to about several hundred rpm.

5. A method as defined in claim 1, wherein the slave medium is rotated at higher than one hundred rpm.

6. A method as defined in claim 1, wherein the slave medium is rotated at several hundred rpm.

7. A method as defined in claim 1, wherein the rotation of the slave medium is stopped when the intensity of the magnetic field is gradually reduced to not stronger than the predetermined value.

8. A method of magnetic transfer for magnetically transferring information represented by a pattern of magnetic layer formed on a master information carrier to a magnetic layer of a disc-like slave medium comprising the steps of
applying an initial DC magnetic field to the slave medium to initially magnetize the magnetic layer of the slave medium in one direction of concentric recording tracks and
applying a transfer magnetic field to the slave medium in the direction opposite to the direction of the initial-magnetization with the initially-magnetized magnetic layer of the slave medium held in close contact with the magnetic layer on the master information carrier, wherein the improvement comprises that
at least one of applying the initial DC magnetic field and applying the transfer magnetic field is effected by applying a magnetic field to a part of the slave medium while the slave medium is being rotated relatively to the magnetic field and
moving the slave medium relatively to the magnetic field so that the center of the slave medium is moved away from the magnetic field in a radial direction with the slave medium kept rotated and
wherein the intensity of the initial DC magnetic field is not lower than the coercive force of the magnetic layer of the slave medium.

9. A method as defined in claim 8 in which the intensity of the magnetic field is gradually reduced to not stronger than a predetermined value while moving the slave medium relatively to the magnetic field so that the center of the slave medium is moved away from the magnetic field in a radial direction in at least one of applying the initial DC magnetic field and applying the transfer magnetic field.

10. A method as defined in claim 8 in which the intensity of the initial DC magnetic field is not lower than 1.2 times the coercive force of the magnetic layer of the slave medium.

11. A method as defined in claim 8 in which the intensity of the transfer magnetic field is not lower than about 0.6 times the coercive force of the magnetic layer of the slave medium and not higher than about 1.3 times the coercive force of the magnetic layer of the slave medium.

12. A method as defined in claim 8 in which the slave medium is rotated at about several rpm to about several hundred rpm.

13. A method as defined in claim 8, wherein the magnetic field is applied to one side of a rotation axis of the slave medium and the radial direction is toward another side of the rotation axis of the slave medium.

14. A method as defined in claim 8, wherein the slave medium is rotated at higher than one hundred rpm.

15. A method as defined in claim 8, wherein the slave medium is rotated at several hundred rpm.

16. A method of magnetic transfer for magnetically transferring information represented by a pattern of magnetic layer formed on a master information carrier to a magnetic layer of a disc-like slave medium comprising the steps of
applying an initial DC magnetic field to the slave medium to initially magnetize the magnetic layer of the slave medium in one direction of concentric recording tracks and
applying a transfer magnetic field to the slave medium in the direction opposite to the direction of the initial-magnetization with the initially-magnetized magnetic layer of the slave medium held in close contact with the magnetic layer on the master information carrier, wherein the improvement comprises that
at least one of applying the initial DC magnetic field and applying the transfer magnetic field is effected by applying the magnetic field while the slave medium is being rotated relatively to the magnetic field and stopping the rotation of the slave medium after the intensity of the magnetic field is gradually reduced to not stronger than a predetermined value and
wherein the magnetic field is substantially applied to only one side of a rotation axis of the slave medium.

17. A method of magnetic transfer for magnetically transferring information represented by a pattern of magnetic layer formed on a master information carrier to a magnetic layer of a disc-like slave medium comprising the steps of
applying an initial DC magnetic field to the slave medium to initially magnetize the magnetic layer of the slave medium in one direction of concentric recording tracks and
applying a transfer magnetic field to the slave medium in the direction opposite to the direction of the initial-magnetization with the initially-magnetized magnetic layer of the slave medium held in close contact with the magnetic layer on the master information carrier, wherein the improvement comprises that
at least one of applying the initial DC magnetic field and applying the transfer magnetic field is effected by applying the magnetic field while the slave medium is being rotated relatively to the magnetic field and stopping the rotation of the slave medium after the intensity of the magnetic field is gradually reduced to not stronger than a predetermined value,
wherein the intensity of the transfer magnetic field is not lower than about 0.6 times the coercive force of the magnetic layer of the slave medium and not higher than about 1.3 times the coercive force of the magnetic layer of the slave medium, and
wherein the magnetic field is substantially applied to only one side of a rotation axis of the slave medium.

18. A method of magnetic transfer for magnetically transferring information represented by a pattern of magnetic layer formed on a master information carrier to a magnetic layer of a disc-like slave medium comprising the steps of
applying an initial DC magnetic field to the slave medium to initially magnetize the magnetic layer of the slave medium in one direction of concentric recording tracks and
applying a transfer magnetic field to the slave medium in the direction opposite to the direction of the initial-magnetization with the initially-magnetized magnetic layer of the slave medium held in close contact with the magnetic layer on the master information carrier, wherein the improvement comprises that
at least one of applying the initial DC magnetic field and applying the transfer magnetic field is effected by applying the magnetic field while the slave medium is being rotated relatively to the magnetic field and stopping the rotation of the slave medium after the intensity of the magnetic field is gradually reduced to not stronger than a predetermined value, and
wherein the predetermined value is substantially 1/10 th of the intensity of the magnetic field.

* * * * *